GEORGE LIGHTBODY.
Improvement in Thermometric Steam Gauge.
No. 120,201. Patented Oct. 24, 1871.

Witnesses. Inventor.
Geo Lightbody

UNITED STATES PATENT OFFICE.

GEORGE LIGHTBODY, OF NEW YORK, N. Y.

IMPROVEMENT IN THERMOMETRIC STEAM-GAUGES.

Specification forming part of Letters Patent No. 120,201, dated October 24, 1871.

*To all whom it may concern:*

Be it known that I, GEORGE LIGHTBODY, of the city, county, and State of New York, have invented a new and Improved Apparatus for Determining and Indicating the Temperature and Pressure of Steam or Fluid in boilers, pipes, or other receptacles; and I hereby declare that the following is a full and exact description thereof, reference being had to the accompanying drawings and the letters of reference marked thereon.

Figure 1:
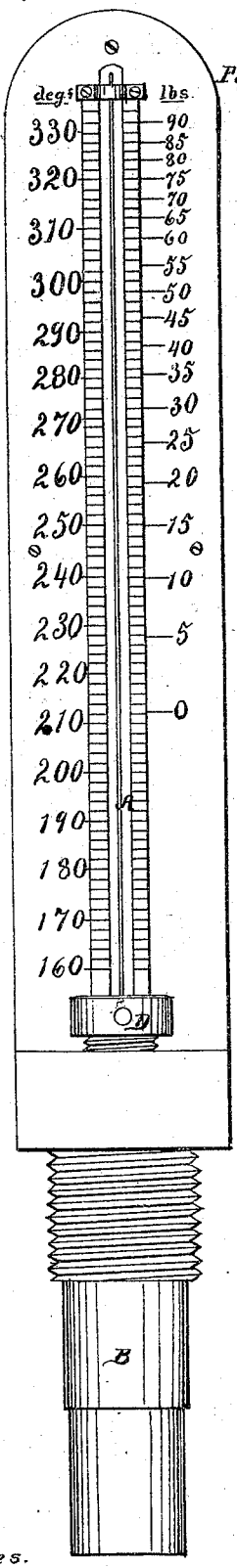
Figure 2:
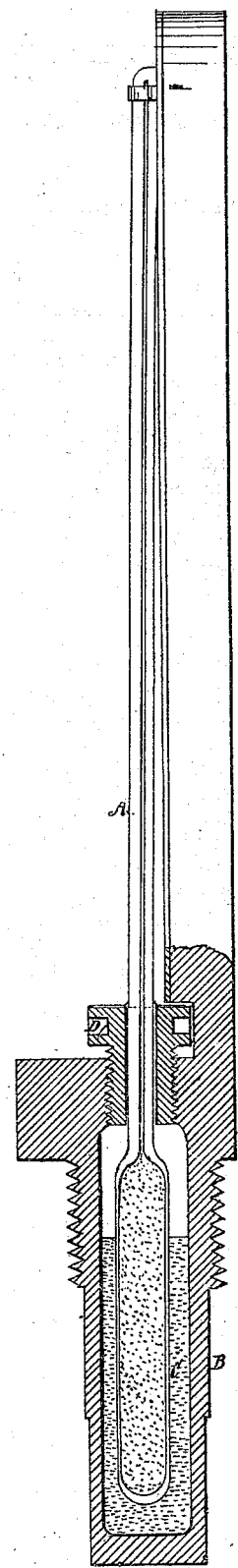

Of the drawings, Fig. 1 is a front elevation, and Fig. 2 a side elevation with a portion of the outer case removed, showing the arrangement of the interior in section.

The invention consists of a thermometer with the proper scales for heat and pressure, shown at A, Figs. 1 and 2, the bulb of A being incased in a vessel or sheath, B, Figs. 1 and 2, of metal or other suitable material, which contains a quantity of mercury, oil, pitch, or other conducting substance, C, Fig. 2, which by its yielding nature, accommodates itself to all the variations of size in the thermometer-bulb or sheath, being at all temperatures a perfect and sensitive conductor of the heat, while the sheath protects the thermometer-bulb from the pressure of the steam, which, by altering the size of the bulb, destroys the accuracy of the thermometer when used alone, and also protects it from accident. D is a packing-plug or stopper, of metal or other substance, that steadies the thermometer-glass in position, and also prevents the waste or loss of the conducting medium when tipped by accident or in transportation, the whole being screwed or otherwise secured into boiler, pipe, or steam-chest, forming an accurate and simple permanent indicator of the state of the temperature and pressure therein.

I am aware that a thermometer has been made with a pressure-scale attached. This, therefore, I do not claim. I am aware that it is not new to insert a thermometer in a cylinder of iron filled with oil or mercury, the rim of which should be fixed in an orifice pierced in the upper part of the boiler. Such I do not wish to claim.

That which I do claim, and desire to secure by Letters Patent, is—

The sheath B, tube A, and plug D, in connection with the thermometer A and the conducting material C, when arranged and operating together, substantially as and for the purpose described.

GEORGE LIGHTBODY.

Witnesses:
W. H. MELICK,
J. MCBEATH.

(148)